Patented Jan. 24, 1950

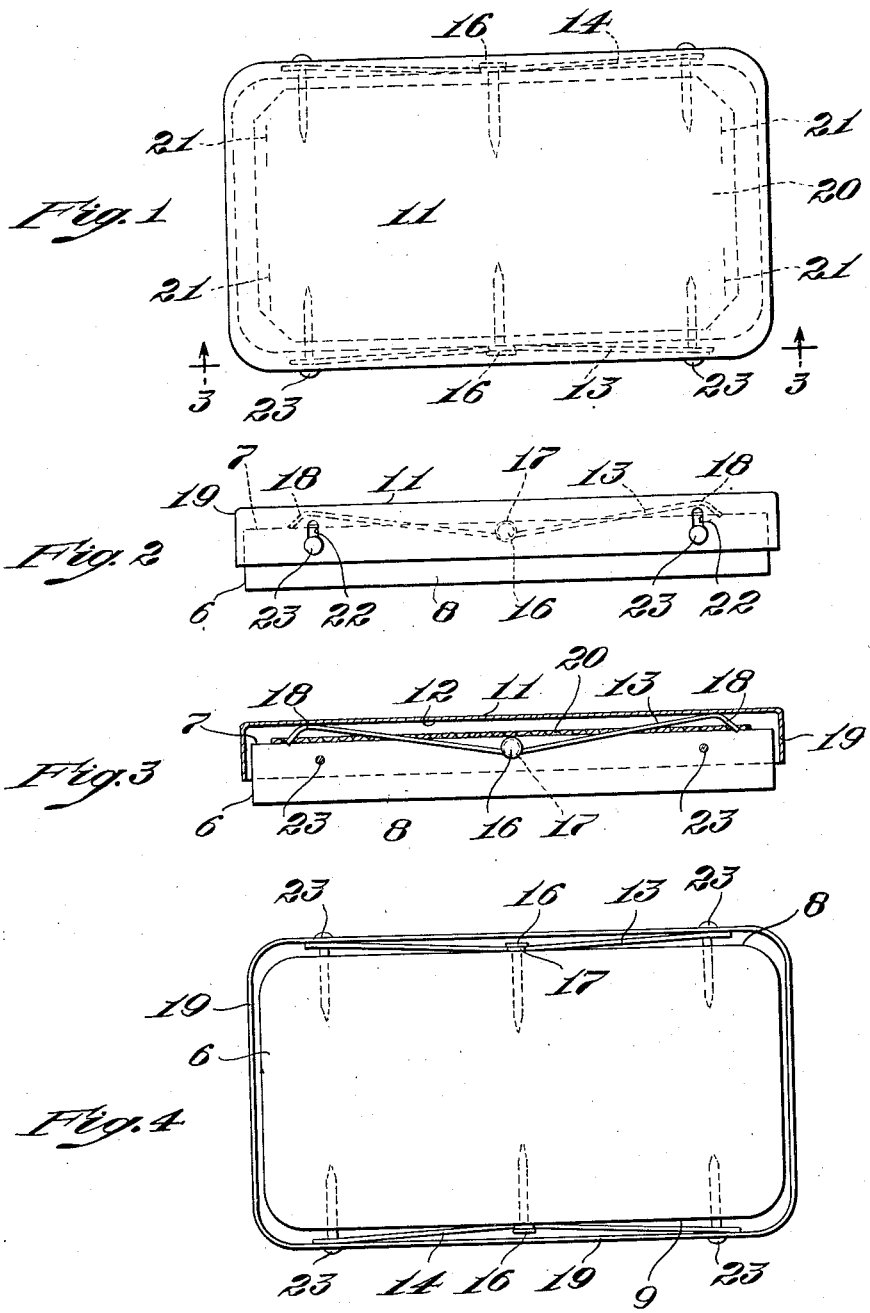

2,495,367

UNITED STATES PATENT OFFICE 2,495,367

INSECT EXTERMINATING DEVICE

William M. Edmonstone, Hyde Park, Mass.

Application June 15, 1948, Serial No. 33,162

5 Claims. (Cl. 43—110)

The most effective insect sprays give only temporary protection and repetitious use thereof is expensive, disagreeable and troublesome. Furthermore as insect sprays are effective primarily against the adult moths, the use thereof often fails to control the depredations of the larvae which are hidden in dark and inaccessible locations where they cannot readily be reached with the toxic liquid.

Objects of this invention are to provide a device which gives indirect protection from the depredations of the larvae of moths and similar insects, which destroys such larvae, which is long lasting, which is safe, odorless and effective, which can be used as a substitute for sprays or as a supplementary device for the extermination of these fabric destroying insects, and which advances generally the art of moth control.

In a broad aspect the invention contemplates an insect exterminating device having a spring fastened to one of two juxtaposed members and bearing against the other member yieldably to maintain a spaced relationship therebetween. One of the members is adapted to support an insect attracting material in the space therebetween, which is surrounded by an enclosure to exclude the light. The larvae developing from eggs deposited on the insect attracting material are periodically destroyed by forcing the members together against the force of the spring thereby to crush the larvae, eggs and any adult insects which may be present.

In a specific aspect the invention contemplates a device comprising a base member having a plane surface and two parallel sides projecting therefrom. The plane surface of the base member is juxtaposed with the plane surface of a cooperating cover member; the surfaces are yieldably maintained in spaced relationship by two double cantilever springs, each pivotally connected at its center to a respective side of the base member and having ends bearing against the plane surface of the cover member. The plane surface of the base member is adapted to support insect attracting material. A skirt projects from the cover member substantially to enclose the base member so that light is excluded from the space therebetween. The portion of the base adjacent the sides of the base member has a plurality of elongated apertures through each of which a pin-shaped member projects into the adjacent side of the base member thereby to act as a guide for the cover member.

To crush any larvae or eggs deposited upon the insect attacking material, the members are forced together against the force of the springs by stepping on the top of the cover member or in any other convenient manner.

These and other objects and aspects of the invention will be apparent from the specific embodiment illustrated in the drawing in which:

Fig. 1 is a plan view of the invention;

Fig. 2 is a side elevation view of the same embodiment of the invention as is shown in Fig. 1;

Fig. 3 is a cross sectional view on line 3—3 of Fig. 1; and

Fig. 4 is a bottom view of the embodiment of Fig. 1.

In the particular embodiment of the invention chosen for purposes of illustration, the moth exterminating device shown in Fig. 1 comprises a wood or plastic base member 6 having a plane surface 7 on the top thereof and two parallel sides 8 and 9 projecting normally from the opposite longitudinal edges respectively of the plane surface 7.

A metal cover 11 is provided with a plane surface 12 juxtaposed with the plane surface 7 of the base 6. The plane surfaces 7 and 12 are yieldably maintained in spaced relationship by a pair of double cantilever springs 13 and 14. Each spring is pivotally connected by a large-headed nail 16 which projects through a loop 17 at the center of the spring into the adjacent side of the base 6. The respective ends of each spring are bent in the form of an arc 18 which bears against the plane surface 12 of the cover 11.

Insect attracting material 20, which may be a piece of felt impregnated with grease, is fastened by the staples 21 to the base 6 which supports the material in the space between the plane surfaces 7 and 12. A skirt 19 formed integrally as a part of the cover 11 projects downwardly to partially enclose the base 6 thereby excluding light from the space between the plane surfaces 7 and 12 wherein is located the insect attracting material 20. Sufficient clearance is provided between the inner surface of the skirt 19 and the sides of the base 6 so that insects may gain access to the material 20.

Two elongate apertures such as the slots 22 (Fig. 2) are cut in the portions of the skirt 19 adjacent the sides 8 and 9 respectively. A pin-shaped member such as the nail 23 projects through each of the respective slots 22 into the base 6. These nails 23 act as guides for the cover 11 and also prevent the base 6 and the cover from becoming separated.

Experience has shown that adult moths prefer a darkened location as a depository for their eggs; and that if the above described insect exterminating device is placed upon the floor of a closet, the moths will be guided by their well developed sense of smell past the clean fabrics to seek the grease impregnated felt 20 whereupon to lay their eggs. The larvae developed from such eggs are periodically destroyed by stepping on the top of the cover 11 so that the material 20 is crushed between the plane surfaces 7 and 12. After the compressing force is removed, the springs 13 and 14 restore the cover 11 to its original position, and the device is again ready to attract moths.

It will be noted that the enticing and periodic destruction of the larvae in this manner results in a two-fold advantage not present in other methods of moth control. First, the adult moths are attracted to a location where the larvae can develop without damaging valuable fabrics. Second, the larvae are prevented from developing into adult moths so that the number of moths is prevented from multiplying and increasing the possibility of future depredations.

It should be understood that the present disclosure is for the purpose of illustration only and that this invention includes all modifications and equivalents which fall within the scope of the appended claims.

I claim:

1. An insect exterminating device comprising two members each having a plane surface and two parallel sides normally projecting therefrom, and two springs each fastened to a respective side of one of said members and bearing against the plane surface of the other thereby yieldably to juxtaposition the plane surfaces of said members in spaced relationship, one of said surfaces being adapted to support insect attracting material in the space between said members, one of said members partially enclosing the other member to exclude light from the space therebetween, whereby pressing together of said members against the force exerted by said springs crushes insects attracted to the material between the plane surfaces of the members.

2. An insect exterminating device comprising two members each having a plane surface and two parallel sides normally projecting therefrom, and two double cantilever springs each pivotally connected at its center to a respective side of one of said members and bearing against the plane surface of the other thereby yieldably to juxtaposition with the plane surface of said members in spaced relationship, one of said surfaces being adapted to support insect attracting material in the space between said members, one of said members partially enclosing the other member to exclude light from the space therebetween, whereby pressing together of said members against the force exerted by said springs crushes insects attracted to the material between the plane surfaces of the members.

3. An insect exterminating device comprising a first member having a plane surface and two parallel sides projecting normally therefrom, a cooperating member having a plane surface juxtaposed with the plane surface of first member, two springs each fastened to a respective side of the first member and bearing against the plane surface of the cooperating member thereby yieldably to maintain the plane surface of said members in spaced relationship, the plane surface of one of said members being adapted to support insect attracting material in the space between the members, and a skirt projecting from one of said members and partially enclosing the other member to exclude light from the space between the members, whereby pressing together of said members against the force exerted by said springs crushes insects attracted to the material between the plane surfaces of the members.

4. An insect exterminating device comprising a first member having a plane surface and two parallel sides projecting perpendicular therefrom, a cooperating member having a plane surface juxtaposed with the plane surface of the first member, two springs each fastened to a respective side of the first member and bearing against the plane surface of the cooperating member thereby yieldably to maintain the plane surfaces of said members in spaced relationship, the plane surface of one of said members being adapted to support insect attracting material in the space between the members, a skirt projecting from one of said members to partially enclose the other member, the portion of said skirt adjacent the sides of the first member having a plurality of elongated apertures therein, and a plurality of pin-shaped members, each projecting through a respective aperture into the adjacent side to act as a guide for the members, whereby pressing together of said members against the force exerted by said springs crushes insects attracted to the material between the plane surfaces of the members.

5. An insect exterminating device comprising a base member having two parallel sides normally projecting therefrom, a cooperating cover member having a plane surface juxtaposed with the plane surface of the base member, two double cantilever springs each fastened at its center to a respective side of the base member and having its ends bearing against the plane surface of said cover member yieldably to maintain the plane surfaces of said members in spaced relationship, the plane surfaces of the base member being adapted to support insect attracting material in the space between the members, a skirt projecting from the cover member substantially to enclose the base member, the portion of the skirt adjacent the sides of the base member having a plurality of elongated apertures therein and a plurality of pin-shaped members each projecting through a respective aperture into the adjacent side of the base member to act as a guide for the cover member, whereby pressing together of said members against the force exerted by said springs crushes insects attracted to the material between the plane surfaces of the members.

WILLIAM M. EDMONSTONE.

REFERENCES CITED

The following references are of record in the file of this patent:

UNITED STATES PATENTS

| Number | Name | Date |
| --- | --- | --- |
| 98,984 | Little | Jan. 18, 1870 |
| 857,446 | Comstock | June 18, 1907 |
| 1,048,479 | Andel | Dec. 31, 1912 |
| 1,439,874 | Dillin | Dec. 26, 1922 |
| 1,473,538 | Bakke | Nov. 6, 1923 |